United States Patent [19]

Talbot

[11] Patent Number: 5,435,239
[45] Date of Patent: Jul. 25, 1995

[54] CONDITIONING ROLLER ASSEMBLY

[75] Inventor: Francois Talbot, Winnipeg, Canada

[73] Assignee: MacDon Industries Ltd., Winnipeg, Canada

[21] Appl. No.: 346,932

[22] Filed: Nov. 23, 1994

[51] Int. Cl.⁶ ............................................. B02B 3/04
[52] U.S. Cl. ........................................ 99/618; 99/523; 99/621
[58] Field of Search ............... 99/518, 519, 520, 523, 99/524, 525, 567, 568, 574–576, 585, 617–622, 623, 624, 625

[56] References Cited

U.S. PATENT DOCUMENTS

| | | | |
|---|---|---|---|
| 3,835,766 | 9/1974 | Satake | 99/618 |
| 4,066,012 | 1/1978 | Satake et al. | 99/622 |
| 4,194,445 | 3/1980 | Gemsjager | 99/620 |
| 4,295,420 | 10/1981 | Satake et al. | 99/618 |
| 4,377,110 | 3/1983 | Matsumoto | 99/523 |
| 4,392,421 | 7/1983 | Yano et al. | 99/621 |
| 4,397,228 | 8/1983 | Thornton | 99/541 |
| 4,432,275 | 2/1984 | Zekert et al. | 99/625 |
| 4,539,904 | 9/1985 | Vick et al. | 99/618 |
| 4,815,370 | 3/1989 | Collins | 99/621 |
| 4,838,494 | 6/1989 | Jakobs | 99/621 |

Primary Examiner—Timothy F. Simone
Attorney, Agent, or Firm—Adrian D. Battison; Murray E. Thrift; Stanley G. Ade

[57] ABSTRACT

A chain drive system is provided for communicating rotation from the bottom roller of a hay conditioner to the top roller of the hay conditioner. The top and bottom rollers include longitudinally extending flutes which intermesh as the rollers rotate. The top roller is mounted for movement at each end upwardly away from the bottom roller to accommodate increased quantities of crop or obstacles. The chain drive maintains angular synchronism between the rollers despite movement of the top roller away from the bottom roller. This is achieved using a single chain wrapped around a drive sprocket on the bottom roller and around two idlers arranged at the apexes of a triangle. The driven sprocket on the top roller is located within the triangle so that the chain wraps around the drive roller into the triangle, around the driven roller and back to the idler at the apex. The top roller is mounted for pivotal movement about an axis midway between the idler sprocket and the drive sprocket and located just outside a line joining the axes of those sprockets. This location of the pivot point and the proper selection of the length of the pivot arm maintains the chain path constant despite the movement of the roller and maintains the required angular synchronism.

3 Claims, 3 Drawing Sheets

CONDITIONING ROLLER ASSEMBLY

This invention relates to a conditioning roller assembly of the type for use in a hay or other forage crop conditioner.

BACKGROUND OF THE INVENTION

Hay conditioners generally include a pair of rollers mounted in co-extensive parallel relationship for rotation about respective axes with the crop arranged to pass between the rollers in a conditioning action.

Each of the rollers carries a plurality of longitudinally extending angularly spaced flutes which project outwardly from the surface of the roller. The rollers are Spaced by a distance such that the flutes intermesh generally without contact between the rollers. The intermeshing of the flutes causes the crop material to be bent as it passes between the rollers causing a cracking of the waxy surface of the crop stem.

It is necessary in such rollers to allow one of the rollers, generally the top roller, to move in a direction to increase the spacing between the axes of the rollers to accommodate different amounts of crop material passing between the rollers and to accommodate obstacles such as stones and sticks which pass through without damage to the rollers. Generally this movement is provided by suspending each end of the top roller on a spring biasing system which allows each end independently to rise and lower in a floating action.

In view of the fact that the rollers carry intermeshing flutes, it is essential to ensure that the rollers are driven in synchronism at all times including accommodating the lifting movement while synchronism is maintained.

A number of previous designs have been proposed and manufactured to provide the drive from the first roller to the second roller to maintain the necessary synchronism. One arrangement includes a gear box having an input attached to the bottom roller and an output shaft attached to the top roller. The output shaft includes universal joints which allows the output shaft to accommodate the up and down movement of the top roller shaft. The gear box arrangement is expensive and is of relatively wide width.

An alternative arrangement includes a double chain drive system. In this system, a drive sprocket on the end of the bottom roller and two idler sprockets are located in a common plane at right angle to the axis of the bottom roller at the apexes of a triangle. A chain wrapped around these three sprockets engages a fourth sprocket driven by the chain between the drive sprocket and one of the idler sprockets. A second chain communicates drive from a fifth sprocket coaxial with and co-rotatable with the fourth sprocket to a driven sprocket on the end of the top roller. The top roller is then positioned within the apexes defining the triangle and can pivot relative to the axis of the fourth and fifth sprocket. This arrangement is highly complex-involving a high number of idler sprockets thus increasing cost and increasing chain wear. The double chain arrangement also significantly increases the width of the device since it must accommodate the two chains side by side.

SUMMARY OF THE INVENTION

It is one object of the present invention, therefore, to provide an improved drive system for conditioning rollers which accommodates the necessity for a synchronous drive between the rollers and reduces the number of sprockets and at the same time minimizes the width of the drive system. It will of course be appreciated that, in order to maximize the width of the rollers, the drive system should be minimized in width within a predetermined machine size.

According to one aspect of the invention there is provided a conditioning roller assembly for a hay conditioner comprising a first roller and a second roller, each roller having thereon means defining a plurality of flutes extending longitudinally thereof at angularly spaced positions therearound, means mounting the rollers in generally parallel relationship each for rotation about its respective axis at spaced positions defining a spacing between the axes such that the flutes of the first roller intermesh with the flutes of the second roller as the rollers rotate, the rollers being substantially coextensive such that a first end of the first roller lies adjacent a first end of the second roller and a second end of the first roller lies adjacent a second end of the second roller, said mounting means mounting the rollers for first relative movement between the first ends and for second relative movement between the second ends with said first and second movements being independent and each in a direction to increase or decrease said spacing between the axes, drive means for driving rotation of the first roller, and drive communication means for synchronously driving rotation of the second roller from the first roller, said drive communication means comprising a first drive sprocket mounted on the first roller at said first end thereof, a second driven sprocket mounted on the second roller at said first end thereof, first and second idler sprockets axially aligned with said first and second sprockets and a chain wrapped around said first and second sprockets and around said first and second idler sprockets for communicating drive from the first drive sprocket to the second driven sprocket, the first drive sprocket and the first and second idler sprockets being located respectively at three apexes of a triangle, the second driven sprocket being located within the triangle such that the chain wraps from the first idler sprocket at one apex around the triangle to the first drive sprocket, around the first drive sprocket at a second apex, extends from said first drive sprocket inwardly into the triangle to the second driven sprocket, wraps around the second driven sprocket and extends from the second driven sprocket outwardly relative to the triangle to said second idler sprocket at a third apex and wraps around the second idler sprocket and returns to the first idler sprocket, said mounting means mounting the second roller and the second driven sprocket for pivotal movement of said second axis in an arc within the triangle about a pivot axis generally parallel to said first and second axes and located at a position such that a distance of the position from a closest portion of a periphery of the second idler sprocket is substantially equal to a closest portion of a periphery of the first drive sprocket, such that said pivotal movement provides said first relative movement while said chain remains substantially in constant tension and said first ends of the first and second rollers remain substantially in angular driving synchronism, In place of the chain, a double sided timing belt could also be used and it is stated that the term "chain" herein is intended to include such an alternative.

One embodiment of the invention will now be described in conjunction with the accompanying drawings in which:

BRIEF DESCRIPTION OF THE DRAWINGS

In the drawings like characters of reference indicate corresponding parts in the different Figures.

DETAILED DESCRIPTION

Figure 1:
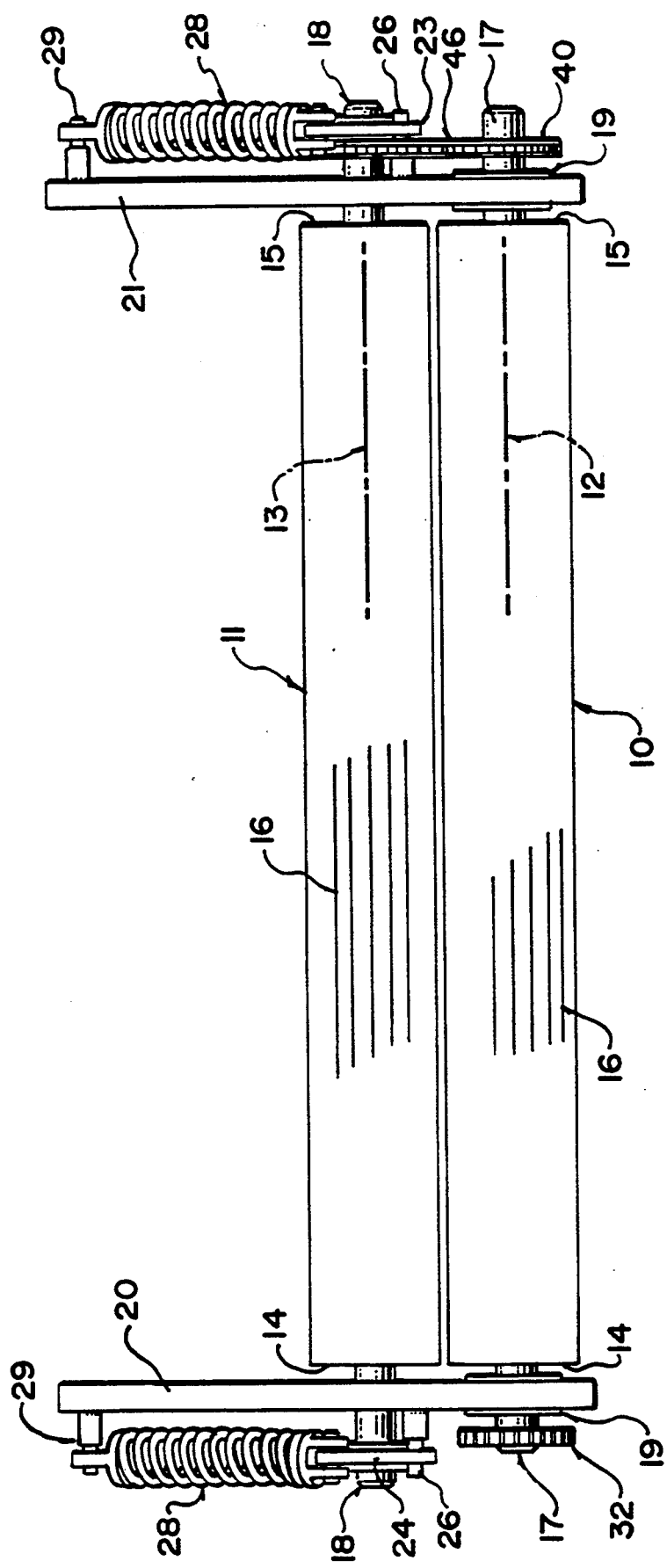
FIG. 1 is schematic rear elevational view of a conditioner roller assembly according to the present invention.
Figure 2:
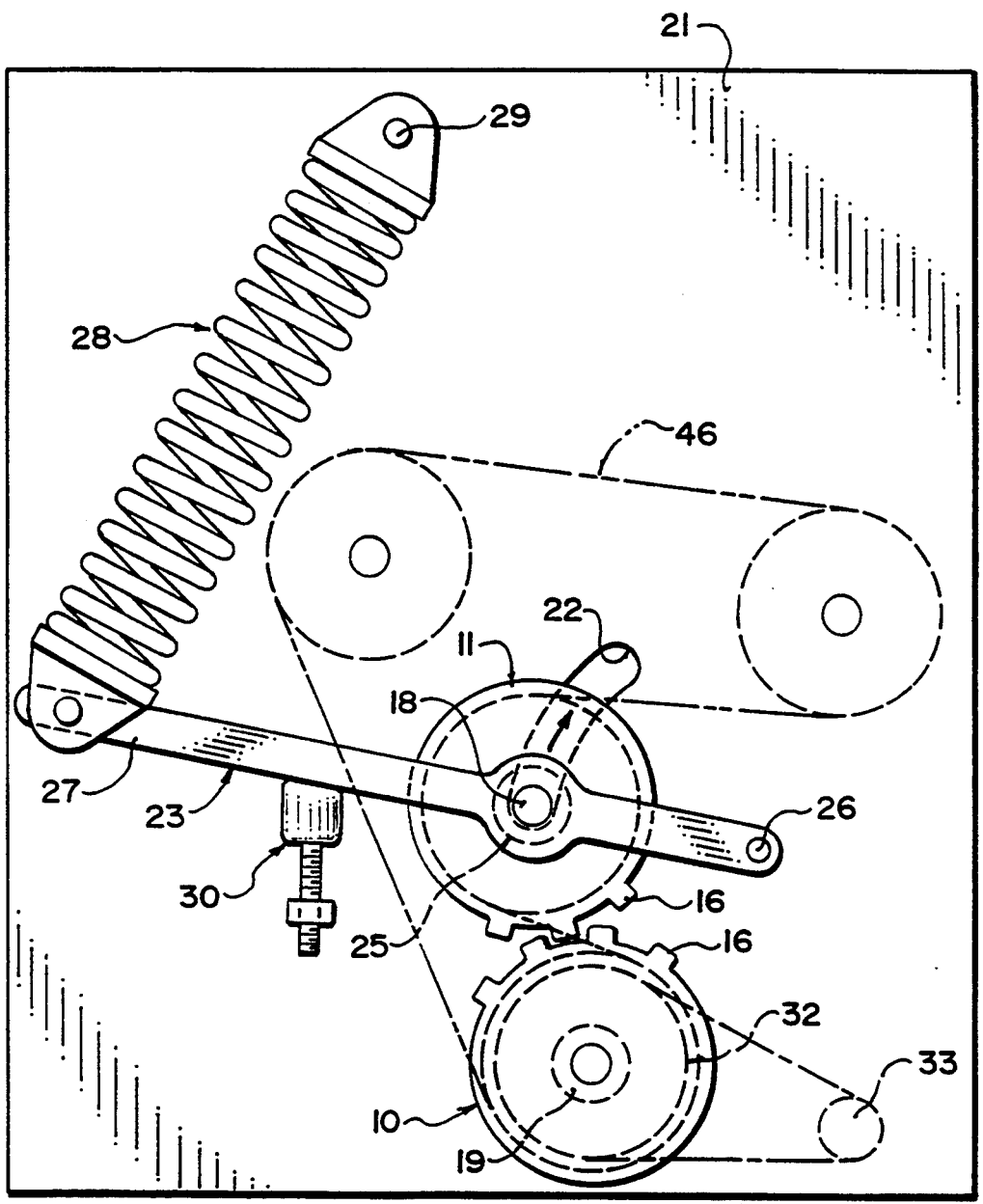
FIG. 2 is an end elevational view of the apparatus of FIG. 1.

The conditioner rollers assembly shown in FIGS. 1 and 2 comprises a bottom roller 10 and a top roller 11 with respective axes 12 and 13 which are arranged substantially parallel. The rollers are substantially coextensive so that each includes first ends 14 and second ends 15 which are arranged in overlying relationship. Each of the rollers carries longitudinally extending flutes 16 which extend along the full length of each roller at angularly spaced positions therearound. For convenience of illustration, the flutes are shown only schematically in FIG. 1 and only a limited number of the flutes are shown in FIG. 2. It will of course be appreciated that the flutes extend all around the roller. The flutes are generally formed by square or rectangular bars which are welded onto the outer surface of the roller so as to project radially outwardly from the surface of the roller for intermeshing as shown best in FIG. 2. Although shown directly longitudinal, in most cases the bars or flutes are arranged in a shallow helix around the cylindrical surface of the roller.

Each of the rollers is fixed to a support shaft so that the bottom roller 10 is mounted on a support shaft 17 and the top roller 11 is mounted on a support shaft 18. The shaft 17 of the bottom roller 10 is mounted in bearings 19 carried in end plates 20 and 21 at respective ends of the rollers. The roller 10 is thus in fixed position relative to the end plates 20 and 21 which are in turn carried on a suitable frame system for the conditioner which is not shown for convenience of illustration.

The shaft 18 of the top roller 11 passes through slots 22 in the end plates 20 and 21 allowing the shaft to move upwardly and downwardly relative to the roller 10 thus increasing or decreasing distance between the axes 12 and 13. The shaft 18 is carried at each end on a respective one of two levers 23 and 24 by bearings 25 mounted on the lever. Each of the levers 23 and 24 is pivotal about a shaft 26 mounted on the end plate parallel to the shaft 18 at a position spaced rearwardly from the shaft 18. The lever thus extends from the pivot shaft 26 to the shaft 18 and beyond the shaft 18 to a forward end 27 at which is provided a suitable biasing system to provide a downward force on the lever pressing the lever and therefore the roller 11 downwardly toward the roller 10. In the embodiment shown, the biasing system comprises a spring 28 extending from a mounting pin 29 on the end plate 21 to the lever 23. An adjustable stop member 30 is mounted on the end plate to limit the downward movement of the lever 23. In the closest position of approach of the roller 11 toward the roller 10 a slight spacing is maintained so as to prevent the flutes engaging the surface of the opposed roller. The stop 30 can be adjusted upwardly so as to increase the spacing between the rollers in conditions where this is required.

The bottom roller 10 is driven at the end 14 by a sprocket 32 driven by a chain or other drive element from a suitable drive source 33 on the machine. Thus the bottom roller 10 is driven at a required rate of rotation which can be adjustable if required.

Figure 3:
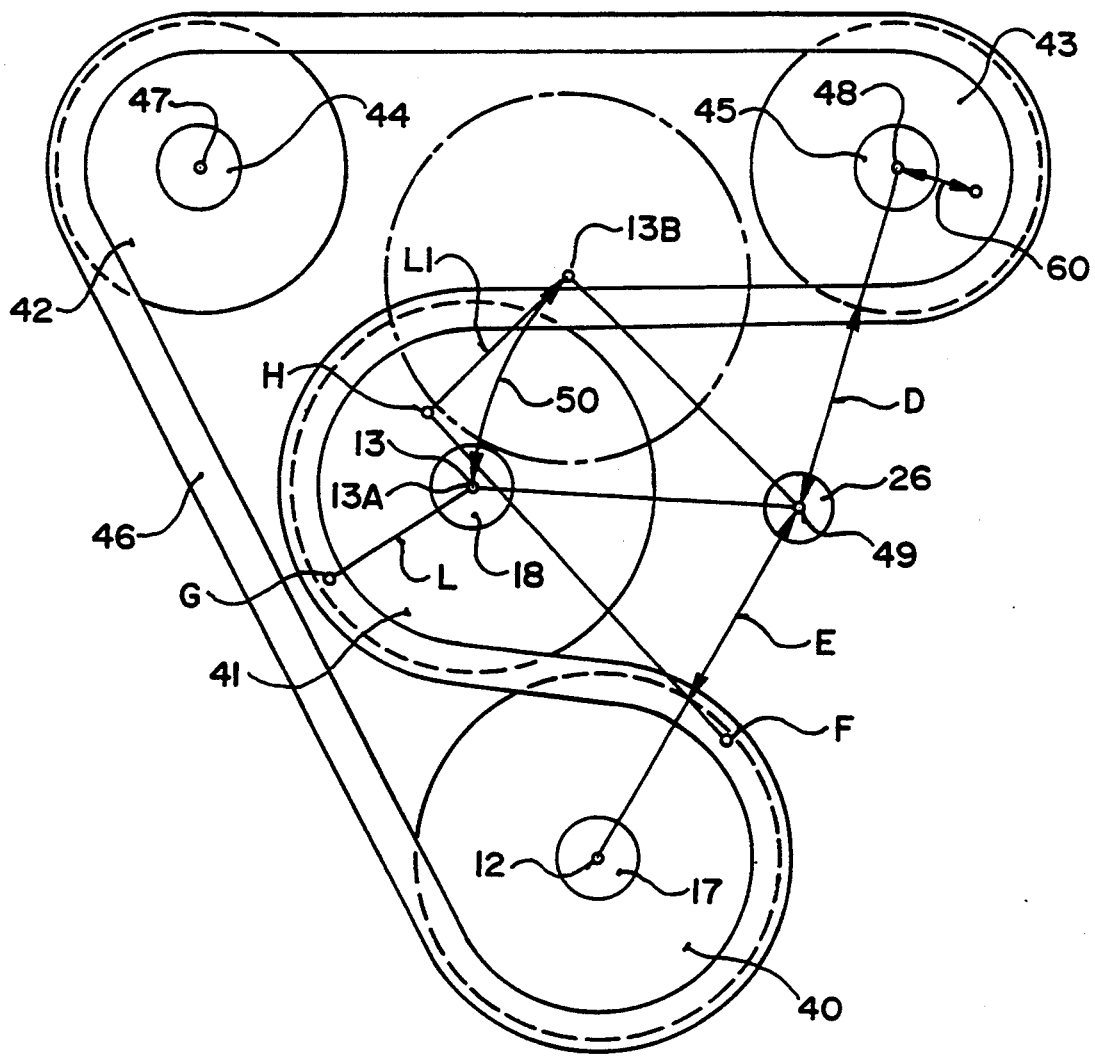
FIG. 3 is a schematic end elevational view similar to that of FIG. 2 showing the arrangement of the drive sprockets and the path of the chain for effecting the synchronous drive.

The present invention relates to the drive system for synchronously driving the top roller 11 from the bottom roller 10. This arrangement is provided at the right hand end 15 of the rollers adjacent the end plate 21 and is shown schematically in FIG. 2 and more detail of the location of the various sprockets is shown in FIG. 3.

The drive system therefore comprises a drive sprocket 40 carried on the shaft 17 of the bottom roller 11. A driven sprocket 41 is mounted on the shaft 18 for driving the shaft 18. The system further includes a pair of idler sprockets 42 and 43 each mounted on a respective shaft 44, 45 carried on the end plate 21. The drive sprocket 40, the driven sprocket 41, the idler sprocket 42 and the idler sprocket 43 are all mounted in a common plane parallel to the end plate 21. A chain 46 wraps around the sprockets for effecting communication of drive from the drive sprocket 40 to the driven sprocket 41.

The sprocket 40 includes an axis lying on the axis 12 of the shaft 17. The sprocket 41 includes an axis lying on the axis 13 of the shaft 18. The sprocket 42 includes an axis 47 and the sprocket 43 includes an axis 48. The axes 12, 47 and 48 are arranged at apexes of a triangle. The sprocket 41 is positioned within the triangle so that the chain extends around the first idler sprocket 42 along one side of the triangle to the drive sprocket 40 around the drive sprocket 40 into the triangle, wraps around the driven sprocket 41 and extends therefrom outwardly toward the side of the triangle at the second idler sprocket 43 positioned at the apex 48. From the second idler sprocket 43, the chain extends along one side of the triangle back to the initial position at the idler sprocket 42.

The pivot pin 26 of the lever 23 is located at an axis 49. Thus the axis 13 of the driven sprocket 41 can pivot on the lever 23 about an arc 50 around the axis 49. Two extreme positions of the movement are shown in FIG. 3. This movement, as previously explained, increases the spacing between the rollers 10 and 11 to accommodate the required movement for passage therebetween of the crop material.

The axis 49 of the pin 26 is located at a position such that a distance D of the axis 49 from the periphery of the idler sprocket 43 is equal to a distance E of the axis 49 from the periphery of the drive sprocket 40. The distances D and E are measured along a line joining the axis 49 to the axis 12 and the axis 48 so that the distances D and E are equal to the distance of closest approach of the periphery of the sprockets, In a circumstance where the drive sprocket is equal in diameter to the idler sprocket 43, the distances of the axis 49 from the axes 12 and 48 would indeed be equal. In an arrangement as shown, however, the idler sprocket is of slightly reduced diameter for purposes of manufacturing convenience and cost.

The position of the axis 49 along the imaginary line which is equi-distant from the periphery of each of the sprockets 40 and 43 is selected relative to the length of the lever between the axis 49 and the axis 13 so that the amount of movement of the sprocket 41 can be maximized. Thus in the two extreme positions shown in FIG. 3, the sprocket is positioned so that it is relatively symmetrical in its approach to the sprocket 40 and the length of the chain on the side of the triangle. As the arrangement is symmetrical, in the opposed position that is the position of maximum spacing of the roller 11 from the roller 10, again the periphery of the driven sprocket 41 is symmetrical or equidistantly spaced from the periphery of the idler sprocket 43 and from the length of the chain along the side of the triangle.

In the arrangement as shown, this maximizing of the amount of movement locates the axis 49 at a position just outside a line interconnecting the axis 12 and 48.

With these positions of the axes of the sprockets and the pivot axis 49, movement of the axis 13 between the extreme positions as shown maintains the chain path length of constant length so that there is no necessity to take up changes in length in the chain. In addition the movement as shown maintains the ends 15 of the rollers in proper synchronism. This synchronism is required since it is essential to maintain the flutes in mesh even when that end of the roller is moved sufficiently apart to separate the in-mesh arrangement. In such movements the other end of the rollers may remain in mesh and in any event it is necessary of course to keep the rollers in synchronism when they are fully separated so that when they return to the meshing arrangement the flutes properly intermesh. It is also important to maintain constant rotation speed of the top roller as it moves through the axis 13 since otherwise a change in speed would cause high acceleration and deceleration of the rollers thus inducing high loads in the chain.

For the purposes of showing the effect on the chain of the movement of the axis 13 from the first position 13A to the second position 13B, a length of chain is selected extending from a position F on the sprocket 40 to a position G on the sprocket 41. This same length of chain extends from the position F on the sprocket 40 to the position H on the sprocket 41 when moved to the axis position 13B. An imaginary line L is drawn from the axis 13 to the position G and a second imaginary line L1 is drawn from the axis 13B to the position H. It will be noted that these lines are approximately parallel showing substantially no change in the angular orientation of the sprocket 41 as it moves from the axis position 13A to the axis position 13B.

The pivotal movement of the axis 13 from the position 13A to the position 13B through the arc 50 maintains the chain at a substantially constant length so that it is under substantially constant tension. Again the movement is not exactly that required to maintain the chain path length constant but the minor deviation is insufficient to cause slackening of the chain or stuttering of the motion.

Adjustment of the path length around the sprockets to accommodate changes in chain length caused by stretching or replacement is effected by moving the idler sprocket 43 in the direction of the arrow 60 which is substantially at right angles to the line joining the axes 12 and 48. Movement in this direction minimizes variation in the lengths D and E so that these lengths remain substantially equal to obtain the movement of the sprocket 41 as described above.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A conditioning roller assembly for a hay conditioner comprising a first roller and a second roller, each roller having thereon means defining a plurality of flutes extending longitudinally thereof at angularly spaced positions therearound, means mounting the rollers in generally parallel relationship each for rotation about its respective axis at spaced positions defining a spacing between the axes such that the flutes of the first roller intermesh with the flutes of the second roller as the rollers rotate, the rollers being substantially coextensive such that a first end of the first roller lies adjacent a first end of the second roller and a second end of the first roller lies adjacent a second end of the second roller, said mounting means mounting the rollers for first relative movement between the first ends and for second relative movement between the second ends with said first and second movements being independent and each in a direction to increase or decrease said spacing between the axes, drive means for driving rotation of the first roller, and drive communication means for synchronously driving rotation of the second roller from the first roller, said drive communication means comprising a first drive sprocket mounted on the first roller at said first end thereof, a second driven sprocket mounted on the second roller at said first end thereof, first and second idler sprockets axially aligned with said first and second sprockets and a chain wrapped around said first and second sprockets and around said first and second idler sprockets for communicating drive from the first drive sprocket to the second driven sprocket, the first drive sprocket and the first and second idler sprockets being located respectively at three apexes of a triangle, the second driven sprocket being located within the triangle such that the chain wraps from the first idler sprocket at one apex around the triangle to the first drive sprocket, around the first drive sprocket at a second apex, extends from said first drive sprocket inwardly into the triangle to the second driven sprocket, wraps around the second driven sprocket and extends from the second driven sprocket outwardly relative to the triangle to said second idler sprocket at a third apex and wraps around the second idler sprocket and returns to the first idler sprocket, said mounting means mounting the second roller and the second driven sprocket for pivotal movement of said second axis in an arc within the triangle about a pivot axis generally parallel to said first and second axes and located at a position such that a distance of the position from a closest portion of a periphery of the second idler sprocket is substantially equal to a closest portion of a periphery of the first drive sprocket, such that said pivotal movement provides said first relative movement while said chain remains substantially in constant tension and said first and second ends of the first and second rollers remain substantially in angular driving synchronism.

2. The assembly according to claim 1 wherein the second roller is mounted on a shaft and wherein the shaft at said first end of the second roller is mounted on a lever pivotal about said position and including spring biasing means biasing this lever in a direction around said position to move the second roller toward the first roller.

3. The assembly according to claim 1 wherein the second idler sprocket is movable in a direction substantially at a right angle to a line joining the second and third apexes for adjusting tension in the chain.

* * * * *